(12) United States Patent
Nguyen et al.

(10) Patent No.: US 9,328,532 B2
(45) Date of Patent: May 3, 2016

(54) ELECTRONIC LOCKSET WITH MULTI-SOURCE ENERGY HARVESTING CIRCUIT

(71) Applicant: KWIKSET CORPORATION, Lake Forest, CA (US)

(72) Inventors: Thuan Nguyen, Aliso Viejo, CA (US); Michael Maridakis, Garden Grove, CA (US); Troy Brown, Aliso Viejo, CA (US); Nedal Akram Almomani, Mission Viejo, CA (US)

(73) Assignee: Kwikset Corporation, Lake Forest, CA (US)

( * ) Notice: Subject to any disclaimer, the term of this patent is extended or adjusted under 35 U.S.C. 154(b) by 0 days.

(21) Appl. No.: 14/197,815

(22) Filed: Mar. 5, 2014

(65) Prior Publication Data

US 2014/0260459 A1    Sep. 18, 2014

Related U.S. Application Data

(60) Provisional application No. 61/777,872, filed on Mar. 12, 2013, provisional application No. 61/820,437, filed on May 7, 2013.

(51) Int. Cl.
*H02J 7/00* (2006.01)
*E05B 47/00* (2006.01)
(Continued)

(52) U.S. Cl.
CPC ............ *E05B 47/00* (2013.01); *G07C 9/00182* (2013.01); *H01M 2/105* (2013.01);
(Continued)

(58) Field of Classification Search
CPC ....................................................... H02J 7/025

USPC ......................................................... 320/108
See application file for complete search history.

(56) References Cited

U.S. PATENT DOCUMENTS 5,632,169 A    5/1997    Clark et al.
5,831,417 A    11/1998    Chu
(Continued)

FOREIGN PATENT DOCUMENTS

| DE | 3612761 A1 | 10/1987 | |
| EP | 2071522 A1 | 6/2009 | |
| EP | 2071522 A1 * | 6/2009 | ............... G07C 9/00 |

OTHER PUBLICATIONS

International Search Authority; International Search Report; Jun. 25, 2014.

(Continued)

*Primary Examiner* — Edward Tso
*Assistant Examiner* — Ahmed Omar
(74) *Attorney, Agent, or Firm* — Barnes & Thornburg LLP

(57) ABSTRACT

An electronic lockset with a radio frequency harvesting circuit. In one embodiment, the electronic lockset includes a mechanical locking portion movable between a locked position and an unlocked position. One or more energy consumption devices are provided that actuate the mechanical locking portion between the locked position and the unlocked position. A rechargeable battery provides electrical power to the energy consumption devices. A radio frequency ("RF") transmitter and RF energy harvesting circuit are used to wirelessly recharge the battery. Typically, the RF transmitter is configured to transmit at a predetermined frequency. The RF energy harvesting circuit is tuned to the predetermined frequency and is electrically coupled with the rechargeable battery to recharge the battery.

19 Claims, 4 Drawing Sheets

(51) Int. Cl.

| | |
|---|---|
| *G07C 9/00* | (2006.01) |
| *H01M 2/10* | (2006.01) |
| *H02J 7/02* | (2016.01) |
| *H01M 10/42* | (2006.01) |
| *H01M 10/46* | (2006.01) |
| *H02J 5/00* | (2016.01) |
| *H02J 17/00* | (2006.01) |

(52) U.S. Cl.
CPC ............ *H01M10/425* (2013.01); *H01M 10/46* (2013.01); *H02J 5/005* (2013.01); *H02J 7/0042* (2013.01); *H02J 7/0045* (2013.01); *H02J 7/025* (2013.01); *H02J 17/00* (2013.01); *G07C 2009/00579* (2013.01); *G07C 2009/00634* (2013.01); *G07C 2009/00793* (2013.01); *G07C 2009/00833* (2013.01); *Y10T 70/80* (2015.04)

(56) References Cited

U.S. PATENT DOCUMENTS

| | | | |
|---|---|---|---|
| 6,318,137 | B1 | 11/2001 | Chaum |
| 7,040,125 | B2 | 5/2006 | Ciezki et al. |
| 7,642,669 | B2 | 1/2010 | Spurr |
| 7,952,477 | B2 | 5/2011 | Fogg |
| 8,035,477 | B2 | 10/2011 | Kirkjan |
| 8,079,240 | B2 | 12/2011 | Brown et al. |
| 8,093,986 | B2 | 1/2012 | Harvey |
| 8,284,023 | B2 | 10/2012 | Coutermarsh et al. |
| 2004/0067411 | A1* | 4/2004 | Lisanke .................... 429/90 |
| 2006/0094425 | A1* | 5/2006 | Mickle et al. .............. 455/434 |
| 2007/0109097 | A1* | 5/2007 | Coutermarsh et al. ....... 340/5.73 |
| 2007/0115094 | A1 | 5/2007 | Gillert et al. |
| 2007/0146115 | A1* | 6/2007 | Roosli et al. .................. 340/5.6 |
| 2007/0205902 | A1* | 9/2007 | Cote et al. .................. 340/572.9 |
| 2008/0197968 | A1 | 8/2008 | Schmidt |
| 2009/0211319 | A1 | 8/2009 | McCormack |
| 2009/0308116 | A1 | 12/2009 | Lambrou |
| 2010/0206023 | A1 | 8/2010 | Pollabauer |
| 2010/0326145 | A1 | 12/2010 | Powers |
| 2011/0074342 | A1* | 3/2011 | MacLaughlin ............... 320/108 |
| 2011/0252845 | A1 | 10/2011 | Webb et al. |
| 2011/0282520 | A1 | 11/2011 | Nakashima |
| 2011/0291846 | A1 | 12/2011 | Burdenko |
| 2012/0169453 | A1 | 7/2012 | Bryla et al. |

OTHER PUBLICATIONS

International App. No. PCT/US2014/020798, International Preliminary Report on Patentability dated Sep. 24, 2015.

* cited by examiner

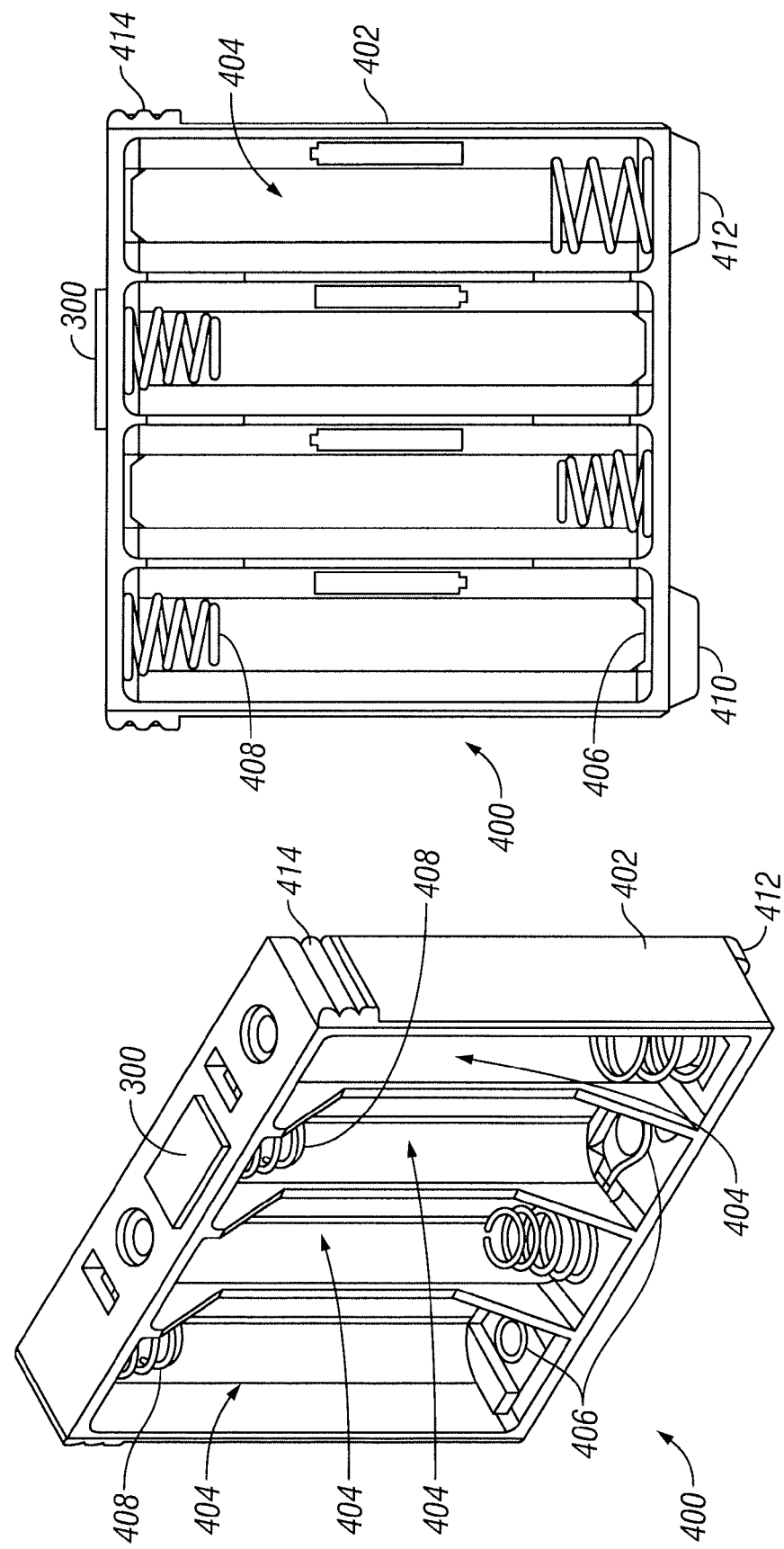

ELECTRONIC LOCKSET WITH MULTI-SOURCE ENERGY HARVESTING CIRCUIT

RELATED APPLICATIONS

This application claims the benefit of U.S. Provisional Application Ser. No. 61/820,437 filed May 7, 2013, for an "Electronic Lockset with Multi-Source Energy Harvesting Circuit," and U.S. Provisional Application Ser. No. 61/777,872 filed Mar. 12, 2013, for an "Electronic Lockset with Multi-Source Energy Harvesting Circuit," both of which are hereby incorporated by reference in their entireties.

TECHNICAL FIELD

This disclosure relates generally to electronic locksets; in particular, this disclosure relates to a circuit that harvests energy from multiple sources to extend battery life in electronic locksets.

BACKGROUND

Electronic locksets are well known. These types of locksets require electrical energy to operate. Existing electronic locksets typically use multiple batteries to power the electronics. The batteries drain over time and eventually need to be replaced. Prior to replacing the batteries, the lockset must be operated with mechanical keys, which can be inconvenient. Therefore, there exists a need for a device that could reduce the power consumption of the batteries.

SUMMARY

This disclosure relates to an electronic lockset that includes a multi-source energy harvesting circuit. Instead of relying solely on a battery to supply power to electronics in the lockset, multiple alternative energy sources are harvested to supplement the battery. For example, energy for powering the lockset could be harvested from multiple sources, such as light, heat, vibration and radio frequency waves. By harvesting this energy to supplement the battery, this reduces the power consumption of the battery and thereby extends the battery life.

According to one aspect, this disclosure provides an electronic lockset with a battery. A mechanical locking portion is provided that is movable between a locked position and an unlocked position. One or more energy consumption devices actuate the mechanical locking portion between the locked position and the unlocked position. The lockset includes a converter/aggregator module configured to convert one or more non-electrical sources of energy into an alternative electrical energy source and combine the alternative electrical energy source with electrical energy supplied by the battery. A storage/distributor module is also provided to store the combined energy source. The storage/distributor module is in electrical communication with the energy consumption devices to supply electrical power thereto.

According to a further aspect, this disclosure provides an electronic lockset with a mechanical locking portion movable between a locked position and an unlocked position. One or more energy consumption devices are provided that actuate the mechanical locking portion between the locked position and the unlocked position. A rechargeable battery provides electrical power to the energy consumption devices. A radio frequency ("RF") transmitter and RF energy harvesting circuit are used to wirelessly recharge the battery. Typically, the RF transmitter is configured to transmit at a predetermined frequency. The RF energy harvesting circuit is tuned to the predetermined frequency and is electrically coupled with the rechargeable battery to recharge the battery.

According to a further aspect, this disclosure provides a deadbolt with a locking mechanism moveable between an extended and retracted position. One or more energy consumption devices may be configured to actuate the locking mechanism between the locked and unlocked position. A rechargeable battery may be configured to provide electrical power to the energy consumption devices. A radio frequency ("RF") transmitter may be configured to plug into an AC power outlet. The RF transmitter may be configured to transmit RF energy. An RF energy harvesting circuit may be configured to be electrically coupled with the rechargeable battery. Typically, the RF energy harvesting circuit is configured to convert RF energy received from the RF transmitter to a direct current ("DC") power source for recharging the one or more rechargeable batteries.

According to yet another aspect, the disclosure provides a battery holder for an electronic lockset. The battery holder includes a body with a cavity for receiving one or more batteries. A RF energy harvesting circuit configured to charge any batteries received in the body is carried by the body. The body is configured to be received by an electronic lockset. In some cases, this allows existing battery holders to be retrofitted for wireless recharging of the batteries using a RF receiver and a wall plug-in transmitter.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF THE DRAWINGS

The present disclosure will be described hereafter with reference to the attached drawings which are given as non-limiting examples only, in which:

FIG. 4 is a perspective view of an example battery holder with an integral RF energy harvesting circuit according to one embodiment; and FIG. 5 is a front view of the example battery holder with an integral RF energy harvesting circuit shown in FIG. 4.

Figure 1:
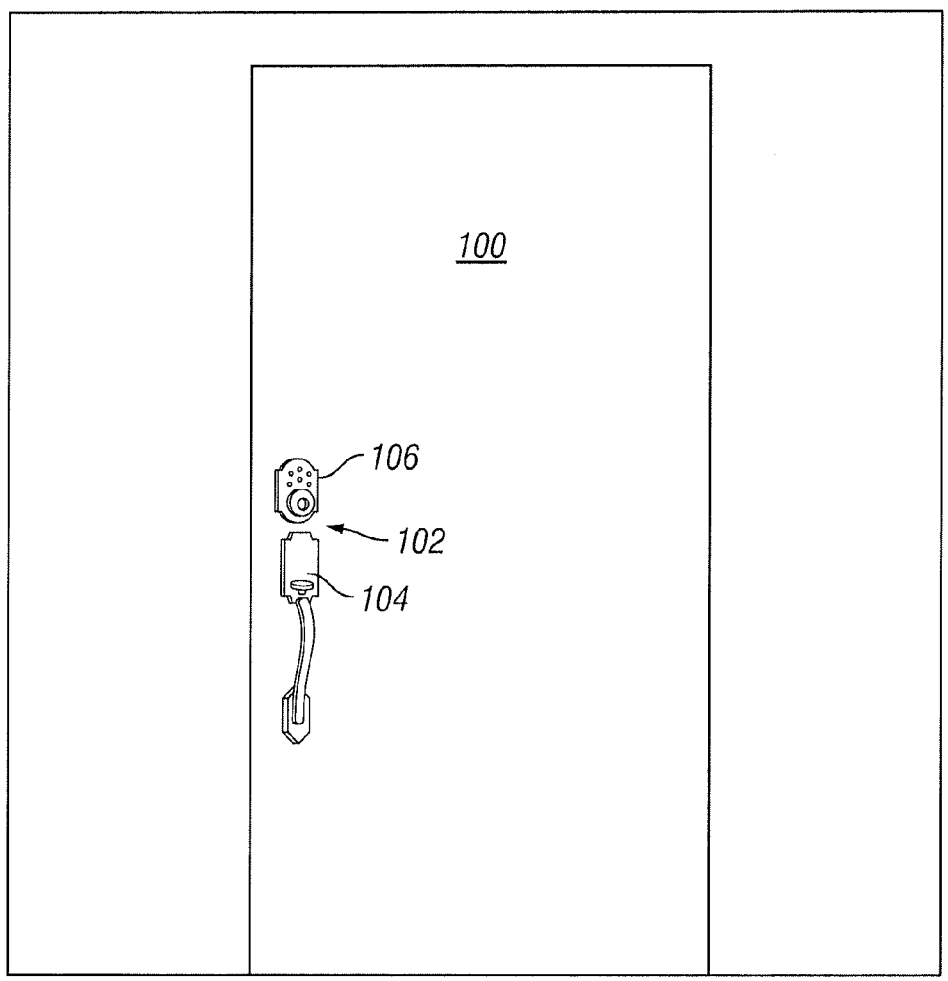
FIG. 1 is a front diagrammatical view of a door with an example electronic lockset with the energy harvesting system installed therein according to one embodiment.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

This disclosure generally relates to the use of energy harvesting to supplement energy demands of an electronic lockset. The term "electronic lockset" is broadly intended to include any type of lockset that uses electrical power in some manner, including but not limited to electronic deadbolts and electronic lever sets. This disclosure is not intended to be limited to a particular type of electronic lockset, but is applicable to supplement the electrical power supply of any type of electronic lockset.

FIG. 1 is a front view of a door 100, which could be an interior or exterior door. In this example, the door 100 has a lockset 102 with a handle 104 and an electronic deadbolt 106. As discussed above, this disclosure relates to any type of electronic lockset; the electronic deadbolt 106 is shown solely for purposes of example and is not intended to limit the scope of the disclosure. A bolt of the electronic deadbolt 106 selectively extends/retracts to lock/unlock the door 100, depending on whether the user has locked/unlocked the electronic deadbolt 106. For example, the electronic deadbolt 106 may include a motor that moves the bolt between a locked and unlocked position. The motor may be actuated by providing an authentication credential to the electronic deadbolt, including but not limited to entering an unlock code into a keypad on the electronic deadbolt 106, using a biometric sensor on the electronic deadbolt 106, or sending an authentication code to the electronic deadbolt 106 using a mobile device. Regardless of how the authentication credential is provided, the electronic deadbolt 106 includes a controller that is programmed to determine whether the received credential is authorized, and if so, allows a user to unlock the deadbolt 106. These electronic functions of the deadbolt 106 require electrical power to operate. As explained below, a main battery is the primary energy source, but multiple alternative energy sources are provided to extend the battery life.

Figure 2:
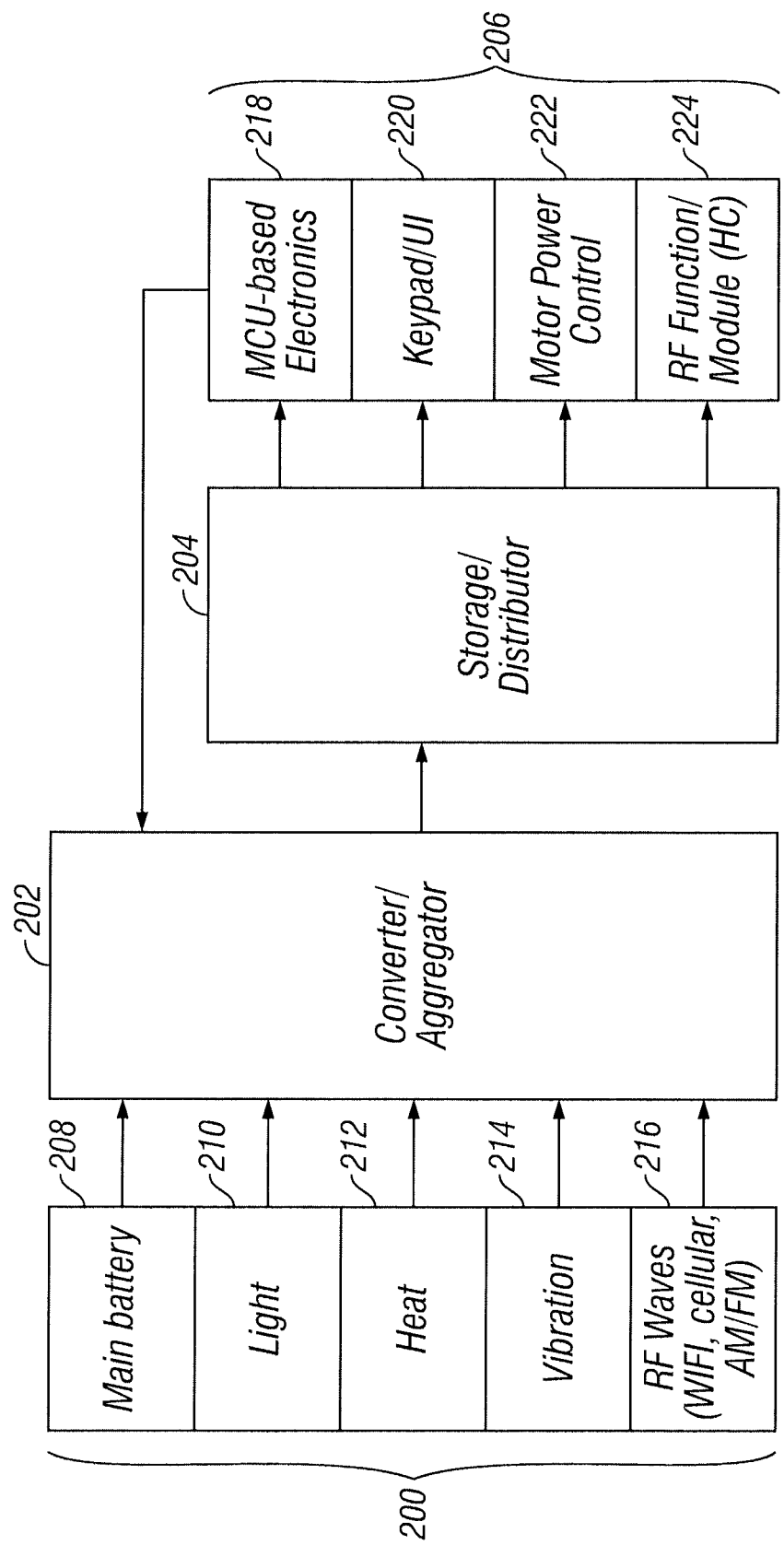
FIG. 2 is a block diagram showing an example of the energy harvesting system according to one embodiment.

FIG. 2 is a block diagram showing certain electronic components of the deadbolt 106. In the example shown, the deadbolt 106 includes multiple energy power sources 200, a converter/aggregator module 202 for combining the energy sources, a storage/distributor module 204 for storing the energy provided from the converter/aggregator module, and one or more energy consumption components 206 that use the energy available from the storage/distributor module 204 to perform one or more functions of the deadbolt 106. In some embodiments, one or more types of energy harvesting power sources may be provided. For example, in one embodiment only a RF energy harvesting circuit may be provided in conjunction with the battery.

In the example shown, there are multiple energy power sources 200, including a main battery 208 that acts as the primary power source. Multiple alternative energy power sources are provided to extend the life of the main battery 208, which include in this example light (solar energy) 210, heat (thermal energy) 212, vibration 214, and radio frequency energy (e.g., wifi, cellular, AM/FM) 216. Although these are examples of alternative energy sources to supplement the main battery 208, this is not intended to be an exhaustive list of every type of alternative energy that could be used. Depending on the circumstances, one or more of these alternative energy sources could be optional. For example, embodiments are contemplated in which one or more alternative energy power source(s) could be provided. In one embodiment, the alternative energy source may be the radio frequency harvesting circuit 216. One skilled in the art should understand that existing circuits for harvesting energy from light, heat, vibration, and radio frequencies are available. For example, existing solar harvesting devices are sold by Texas Instruments of Dallas, Tex. under various product names within the Solar Solutions name. By way of another example, a radio frequency energy harvesting device is available from Texas Instruments under the product name TMS37157.

In the example shown, each of the energy power sources 200 feed into a converter/aggregator module 202. This module 202 is configured to convert the energy sources to electrical energy and combine the energy sources into an aggregate power source by combining each of the energy sources. By way of example, the solar radiation provided by light shining on the deadbolt 106 may be converted to electrical energy using a solar cell. By way of another example, thermal energy applied to the deadbolt, such as a temperature gradient caused by a hot day, could be converted to electrical energy using a well-known thermoelectric effect. In another example, vibration (e.g., movement) associated with the deadbolt 106 could be converted to electrical energy. Likewise, certain radio frequency waves could be harvested for electrical energy. The electrical energy provided by each of these alternative power sources, along with the main battery, may be combined together by the converter/aggregator module 202.

This aggregated electrical energy source is supplied to the storage/distributor module 204, which stores the electrical energy for later use by one or more of the energy consuming devices 206. In the example shown, the storage/distributor module is in electrical communication with the energy consuming devices 206 to provide electrical energy to these devices, which in this example are a controller 218, a keypad (e.g., user interface) 220, a motor power control 222, and a RF function module 224. Although four energy consuming devices are shown for purposes of example, this disclosure is not limited to these particular energy consuming devices. In some cases, more energy consuming devices could be provided in the deadbolt 106 (or other type of lockset) while less energy consuming devices could be provided in other circumstances.

Figure 3:
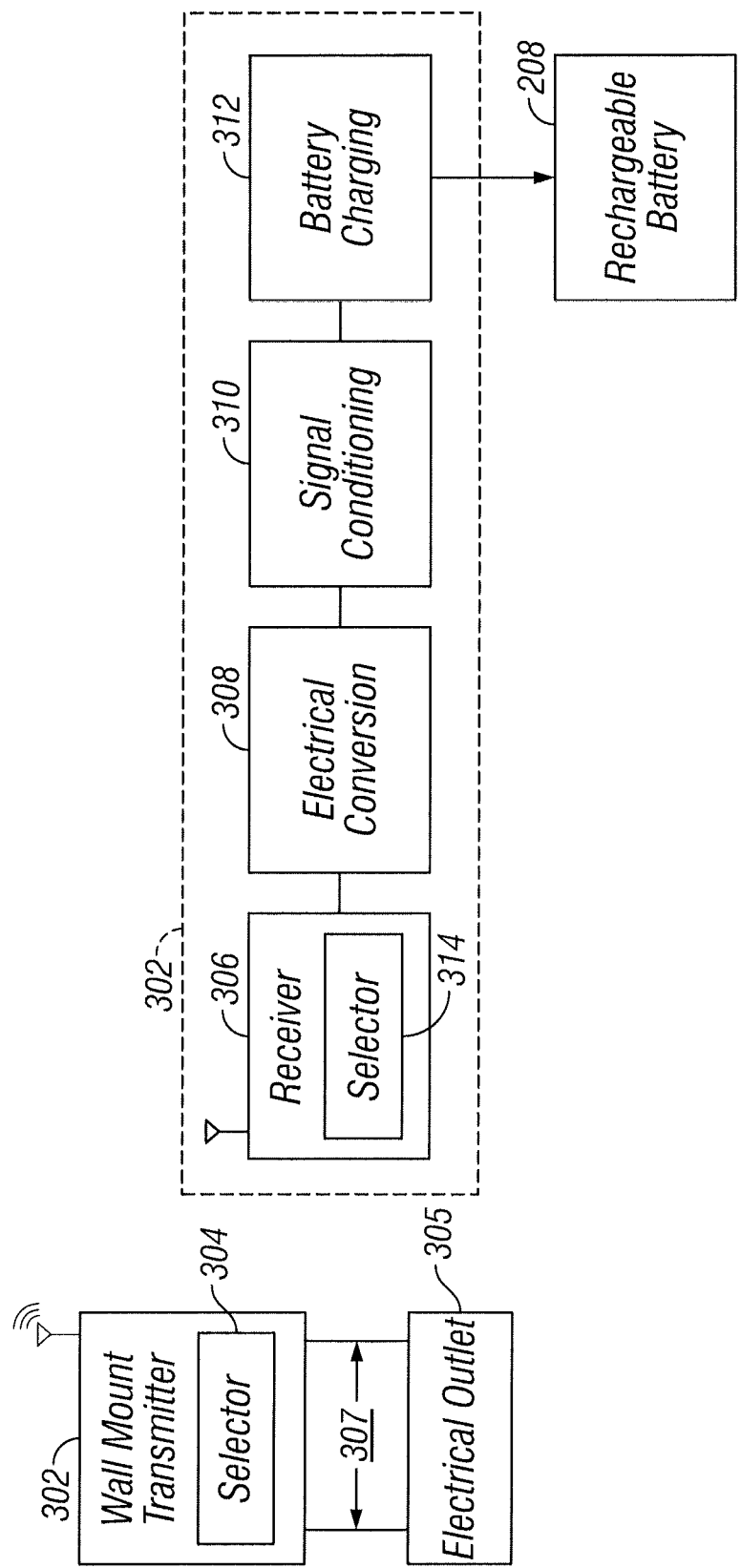
FIG. 3 is a block diagram showing an example embodiment of an RF energy harvesting circuit according to one embodiment.

FIG. 3 shows an example embodiment in which a RF energy harvesting circuit 300 is integral with the lockset 102. In this embodiment, a RF transmitter 302 is provided that can be plugged into an electrical outlet 305, such as a wall outlet, using prongs 307. The RF transmitter 302 transmits a signal that is received by the RF energy harvesting circuit 300 to recharge the main battery 208. In some embodiments, the RF energy harvesting circuit 300 is tuned to a specific frequency at which the RF transmitter 302 transmits. Unlike other RF harvesting methods, the RF energy harvesting circuit 300 may be designed or tuned to a very specific frequency since the RF transmitter 302 transmits at a known frequency. So rather than relying on an arbitrary RF source by having the RF energy harvesting circuit 300 search for energy sources that might or might not exist, this embodiment is designed to match a specific source of RF energy.

In some embodiments, the RF transmitter 302 would transmit a signal on any of the unlicensed frequencies, such as 900 MHz, 2.4 GHz, 5.8 GHz, etc., but this disclosure is not intended to be limited to a particular frequency. One skilled in the art should understand that numerous types of electrical circuits could be used to generate a signal at a desired frequency. In some cases, the frequency at which the RF transmitter 302 transmits may be user selectable, such as by using a selector 304. For example, a user could use the selector 304 to select a frequency at which the RF transmitter 302 transmits, such as by cycling through pre-determined frequencies. This could be desirable, for example, if the user is experiencing interference on the frequency used by the RF transmitter 302 with other devices in the vicinity. For example, the user may be able to change the frequencies from 900 MHz to 2.4 GHz or 5.8 MHz using the selector 304. One skilled in the art should understand tuning the RF transmitter 302 to a user selected frequency could be done using numerous techniques known in the art. The selector 304 could be any type of selector switch, such as a knob switch, slide switch, toggle switch, push button switch, DIP switch, etc. In some cases, the RF transmitter 302 may substantially continuously transmit a signal at a predetermined frequency, which would substantially continuously recharge the battery 208. In other circumstances, it may be desirable to periodically transmit a signal at the predetermined frequency for a certain period of time.

In the embodiment shown in FIG. 3, the RF energy harvesting circuit 300 includes a receiver 306, an electrical conversion circuit 308, a signal conditioning circuit 310, and a battery charging circuit 312. The receiver 306 is configured to receive the signal transmitted by the RF transmitter 302. As discussed above, the receiver 306 may be specifically tuned to a particular frequency at which the RF transmitter 302 transmits a signal. In the example shown, the receiver 306 includes a selector 314 to tune the receiver 306 to receive a frequency corresponding to the RF transmitter 302. If the user selected the 900 MHz for the frequency of the RF transmitter 302, for example, the user could make a corresponding change to the frequency of the receiver 306 using the selector 314 so that the receiver 306 is tuned to a frequency matching that transmitted by the RF transmitter 302. The RF energy received from the receiver 306 is provided to an electrical conversion circuit 308, which converts the RF energy to direct current ("DC") energy. One skilled in the art should understand that numerous types of RF-to-DC circuits could be used. Since the receiver 306 is tuned with the transmitter 302, this improves energy conversion efficiency compared with typical RF energy harvesting circuits that seek energy from unknown frequencies. The signal conditioning circuit 310 receives the DC input from the DC conversion circuit 308 and provides a suitable output to the battery charging circuit 312 to recharge the battery 208.

In some cases, a user will install the lockset 102 that includes an RF energy harvesting circuit 300 and a rechargeable battery 208 (which could be sold separately) onto the door 100. In addition, the user will plug the RF transmitter 302 (which could be a wall-mount module) into an AC outlet closest to the door. The RF transmitter 302 will provide a known RF source to the lock's RF receiver 306 that is tuned to that frequency. As a result, the rechargeable batter(ies) are continuously charged. It is expected that this method will reduce or eliminate the need to replace batteries during the life of the lock. It will also eliminate the possible lock-out condition where the batteries go out when the user is out of the house.

In some embodiments, such as shown in FIGS. 4 and 5, the RF energy harvesting circuit 300 could be integrated into a battery holder 400 that is inserted into the lockset 102. In the example shown, the battery holder 400 includes a body 402 with a plurality of recesses 404 that are each dimensioned to receive a battery. The battery holder 400 is shown with four recesses to receive four batteries for purposes of example only; the battery holder 400 could have less than four recesses or more than four recesses depending on the circumstances. As shown, each of the recesses 404 includes a positive terminal 406 and a negative terminal 408 for electrically coupling with a battery. In this example, the negative terminals 408 are springs that bias the batteries in a manner to retain the batteries in their respective recesses. Although the example battery holder 400 shown provides access to the batteries for replacement, embodiments are contemplated in which the battery holder is sealed without access to remove internal batteries.

The battery holder 404 includes a positive contact 410 and a negative contact 412 for coupling with electronics in the lockset 102. In this manner, the batteries in the battery holder 400 make an electrical connection to supply power to electronics in the lockset 102. The lockset 102 includes a cavity that is dimensioned to receive the battery holder 400. In the example shown, the battery holder includes ridges 414 that allow the user to grip the battery holder for removal from the lockset 102.

Many existing locksets include a battery holder similar to battery holder 400, but without any RF energy harvesting circuit. For example, such battery holders are available for use in an electronic lockset sold under the name SmartCode™ by Kwikset Corporation of Lake Forest, Calif. Since the battery holder 400 could have similar dimensions as existing battery holders, the battery holder 400 could be retrofit to be used with these existing locksets. The user would merely need to switch the existing battery holder with that of the battery holder 400 (that includes the RF energy harvesting circuit 300) and plug the RF transmitter 302 into a nearby AC electrical outlet. In this manner, existing locksets could be retrofitted with wireless battery recharging using the battery holder 400 in conjunction with the RF transmitter 302.

During operation, the electronic lockset (which is a deadbolt 106 in this example) is supplied electrical power using a plurality of energy sources. Although the main battery acts as the primary power source for the electronics, these plurality of alternative energy sources reduce the power consumption of the main battery, which extends battery life.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. An electronic lockset for use with a radio frequency ("RF") transmitter configured to transmit at one or more predetermined frequencies, the electronic locket comprising:
 a locking device moveable between a locked position and an unlocked position;
 one or more energy consumption devices configured to actuate the locking device between the locked position and the unlocked position;
 at least one rechargeable battery configured to provide power to the one or more energy consumption devices;
 a RF energy harvesting circuit configured to be electrically coupled with the rechargeable battery, wherein the RF energy harvesting circuit is configured to convert RF energy to a direct current ("DC") power source for recharging the rechargeable battery;
 wherein the RF energy harvesting circuit is operably associated with a selector configured to tune a RF receiver to a selected frequency from a plurality of predetermined frequencies, wherein the selector is configured to change the selected frequency by cycling through the plurality of predetermined frequencies; and
 wherein the selector comprises a manually-actuated switch configured to change the selected frequency by user actuation of the switch.

2. The electronic lockset as recited in claim 1, wherein the plurality of predetermined frequencies includes one or more of 900 MHz, 2.4 GHz, and 5.8 GHz.

3. The electronic lockset as recited in claim 1, wherein the electronic lockset includes a cavity dimensioned to detachably receive a battery holder, wherein the battery holder is configured to carry the at least one rechargeable battery such that the rechargeable battery is electrically coupled with the one or more of the energy consumption devices, and wherein the RF energy harvesting circuit is integral with the battery holder.

4. The electronic lockset as recited in claim 3, wherein the battery holder includes a body with a plurality of recesses that are each dimensioned to receive a battery.

5. An electronic lockset comprising:
    a mechanical locking portion moveable between a locked position and an unlocked position;
    one or more energy consumption devices configured to actuate the mechanical locking portion between the locked position and the unlocked position;
    at least one rechargeable battery configured to provide electrical power to the energy consumption devices;
    a radio frequency ("RF") transmitter configured to plug into an AC power outlet, wherein the RF transmitter is configured to transmit at a user-selectable predetermined frequency;
    an RF energy harvesting circuit configured to be electrically coupled with the rechargeable battery, wherein the RF energy harvesting circuit is configured to convert RF energy received from the RF transmitter to a direct current ("DC") power source for recharging the rechargeable battery; and
    wherein the energy harvesting circuit includes an RF receiver tunable to the predetermined frequency of the RF transmitter by a user-selectable switch.

6. The electronic lockset as recited in claim 5, wherein the RF energy harvesting circuit is operably associated with a selector configured to tune the RF receiver to a selected frequency.

7. The electronic lockset as recited in claim 5, wherein the RF receiver is tunable to a selected frequency from a plurality of predetermined frequencies.

8. The electronic lockset as recited in claim 7, wherein the plurality of predetermined frequencies includes one or more of 900 MHz, 2.4 GHz, and 5.8 GHz.

9. The electronic lockset as recited in claim 5, wherein the RF transmitter is configured to transmit RF energy at the predetermined frequency substantially continuously.

10. The electronic lockset as recited in claim 5, wherein the RF transmitter is configured to periodically transmit RF energy at the predetermined frequency.

11. The electronic lockset as recited in claim 5, wherein the electronic lockset includes a cavity dimensioned to detachably receive a battery holder, wherein the battery holder is configured to carry the one or more rechargeable batteries such that the one or more rechargeable batteries is electrically coupled with the one or more of the energy consumption devices, and wherein the RF energy harvesting circuit is integral with the battery holder.

12. The electronic lockset as recited in claim 5, wherein the RF transmitter includes a plurality of electrical prongs configured to plug into an AC power outlet.

13. A battery holder for use with an electronic lockset, the battery holder comprising:
    a body including a cavity for receiving one or more batteries, wherein the body is dimensioned to be detachably received by an electronic lockset to supply electrical power thereto; and
    a radio frequency ("RF") energy harvesting circuit including a RF receiver carried by the body, wherein the RF energy harvesting circuit is configured to recharge one or more batteries received in the body, wherein the RF energy harvesting circuit is operably associated with a selector configured to tune the RF receiver to a selected frequency and the selector comprises a manually-actuated switch configured to change the selected frequency by user actuation of the switch.

14. The battery holder as recited in claim 13, wherein the RF energy harvesting circuit is integrated into the body.

15. The battery holder as recited in claim 13, wherein the battery holder includes a body with a plurality of recesses that are each dimensioned to receive a battery.

16. The battery holder as recited in claim 13, wherein the RF receiver is tunable to a selected frequency from a plurality of predetermined frequencies.

17. The battery holder as recited in claim 16, wherein the plurality of predetermined frequencies includes one or more of 900 MHz, 2.4 GHz, and 5.8 GHz.

18. The battery holder as recited in claim 13, wherein the body includes surface ornamentation for gripping the battery holder for removal from the electronic lockset.

19. The electronic lockset as recited in claim 1, wherein the selector is one or more of a knob switch, a slide switch, a toggle switch, a push button switch or a DIP switch.

* * * * *